(12) United States Patent
Smith

(10) Patent No.: US 10,352,753 B1
(45) Date of Patent: Jul. 16, 2019

(54) SIGHT PORT SYSTEM FOR SULFUR PROCESS

(71) Applicant: Strom W. Smith, Gulfport, MS (US)

(72) Inventor: Strom W. Smith, Gulfport, MS (US)

( * ) Notice: Subject to any disclaimer, the term of this patent is extended or adjusted under 35 U.S.C. 154(b) by 0 days.

(21) Appl. No.: 15/948,285

(22) Filed: Apr. 9, 2018

Related U.S. Application Data

(60) Provisional application No. 62/484,088, filed on Apr. 11, 2017.

(51) Int. Cl.
*G01F 23/02* (2006.01)
*C01B 17/02* (2006.01)

(52) U.S. Cl.
CPC .............. *G01F 23/02* (2013.01); *C01B 17/02* (2013.01)

(58) Field of Classification Search
CPC ......... G01F 23/02; G01P 13/008; B01J 3/004; G02B 7/007
USPC .................. 73/323, 326, 328, 329; 220/663; 116/276
See application file for complete search history.

(56) References Cited

U.S. PATENT DOCUMENTS

| | | | | |
|---|---|---|---|---|
| 821,872 A | * | 5/1906 | Hodges | G01F 23/02 220/663 |
| 2,681,034 A | * | 6/1954 | Mannion | G01F 23/02 116/276 |
| 3,874,323 A | * | 4/1975 | Rottig | F17C 13/005 116/276 |
| 4,468,095 A | * | 8/1984 | Meginnis | G02B 7/007 359/819 |
| 4,888,990 A | | 12/1989 | Bryan et al. | |
| 5,821,428 A | | 10/1998 | Taggart et al. | |
| 2015/0033871 A1 | * | 2/2015 | Smith | G01F 1/74 73/861.04 |

* cited by examiner

*Primary Examiner* — Peter J Macchiarolo
*Assistant Examiner* — Nathaniel J Kolb
(74) *Attorney, Agent, or Firm* — Keeling Law, LLC; Kenneth A. Keeling; Mark S. Solomon

(57) ABSTRACT

Embodiments of a sight port system of the present invention generally include a primary lens assembly disposed within a hot zone of a sight port component, wherein the primary lens assembly comprises a primary lens positioned between two annular flanges; the gas sealed hot zone is defined between a cavity closure plate, which may comprise a secondary lens, and the primary lens assembly; a jacketed heating means is disposed circumferentially around the gas filled zone and the primary lens; the primary lens assembly is positioned adjacent a process stream chamber or pipe segment; and a process fluid flowing through the process stream chamber may be visually observed through the primary lens, and the secondary lens if present. Embodiments comprising two opposing primary lens assemblies are also disclosed. Embodiments of a method of using embodiments of a sight port system of the present invention are also provided.

20 Claims, 10 Drawing Sheets

SIGHT PORT SYSTEM FOR SULFUR PROCESS

CROSS-REFERENCE TO RELATED APPLICATIONS

This application claims the benefit of U.S. Provisional Application No. 62/484,088 filed on Apr. 11, 2017, which application is incorporated herein by reference as if reproduced in full below.

STATEMENT REGARDING FEDERALLY SPONSORED RESEARCH OR DEVELOPMENT

Not Applicable.

BACKGROUND OF THE INVENTION

Field of the Invention

The present invention relates to a system for providing observation of liquids in situ in an industrial chemical process. More particularly, embodiments of the present invention are directed to a sight port system for visually monitoring molten sulfur in a process stream.

Background of the Invention

Sulfur is used for manufacturing sulfuric acid, medicine, cosmetics, fertilizers, and rubber products. The majority of sulfur produced worldwide is byproduct sulfur from crude oil refineries and other hydrocarbon processing plants. Hydrogen sulfide produced by such plants is typically converted to sulfur using the Claus process. The resulting sulfur and gases are commonly transported in a liquid-gas two-phase state via pipelines, with the sulfur being kept heated so as to remain in a liquid phase. Sulfur has a melting point of approximately 115° C. (240° F.) and will begin to solidify at temperatures below this point. Therefore, liquid sulfur is typically transported at elevated temperatures in a molten state at approximately 135° C. to 140° C. (275° F. to 284° F.) to provide for optimum viscosity.

DESCRIPTION OF THE RELATED ART

Traditionally, molten sulfur flow has been monitored using a sight port or viewing box to visually observe flow of the mixture. Benefits of visual inspection include allowing the operator to visually observe the viscosity of the mixture or observe the flow for foreign objects. The elevated temperature of the mixture flowing within the pipe often causes the sight port to fog or gather condensation, obstructing the view of the operator. In addition, below-optimum temperatures on the sight port can lead to solids formation thereupon.

U.S. Pat. No. 4,888,990 to Bryan et al. discloses a sight glass apparatus having a pair of flanges wherein each of the flanges includes a tubular top portion which abuts the respective pipes, and wherein the tubular top portion includes a circular cut-out for providing a victaulic type connection for a clamping means to clamp to the respective pipes and a conical section which tapers into an annular rim section having a plurality of apertures wherein a bottom portion of the annular rim includes a center aperture being co-axially aligned when mounted to the pipes.

U.S. Pat. No. 5,821,428 to Taggart et al. discloses a sealed observation element for viewing the flow of molten liquid during the operation of a sulfur recovery unit comprising at least one sight glass that is heated and which may be swept with a purge gas supplied through one or more bleed rings.

U.S. Pat. Nos. 4,888,990 and 5,821,428 are incorporated herein by reference in their entirety as if fully reproduced herein.

BRIEF SUMMARY OF THE INVENTION

Embodiments of a sight port system of the present invention generally include a primary lens assembly disposed within a hot zone of a sight port component, wherein the primary lens assembly comprises a primary lens positioned between two annular flanges, and the inner flange comprises a circumferential flange closure plate; the gas sealed hot zone is defined between a cavity closure plate, which may comprise a secondary lens, and the primary lens assembly; a jacketed heating means is disposed circumferentially around the gas filled zone and the primary lens; the primary lens assembly is positioned adjacent a process stream chamber; and a process fluid flowing through the process stream chamber may be visually observed through the primary lens, and the secondary lens if present. Embodiments comprising two opposing primary lens assemblies are also disclosed. Embodiments of a method of using embodiments of a sight port system of the present invention are also provided.

DETAILED DESCRIPTION OF EXEMPLARY EMBODIMENTS OF THE INVENTION

In the following description of embodiments, orientation indicators such as "top," "bottom," "up," "down," "upper," "lower," "front," "back," etc. are used for illustration purposes only; the invention, however, is not so limited, and other possible orientations are contemplated.

Figure 1:
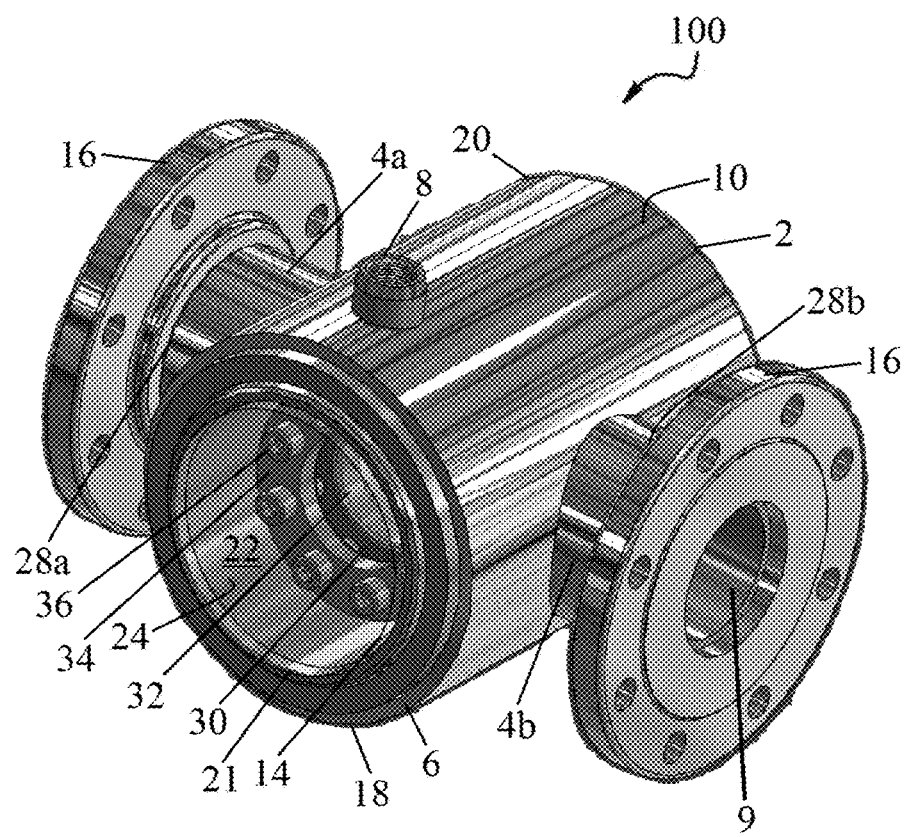
FIG. 1 is an isometric view of an embodiment of a sight port system of the present invention.

Referring first to FIG. 1, an embodiment of a sight port system 100 is depicted. In the embodiment shown in FIG. 1, sight port system 100 comprises a substantially tubular sight port component 2 equipped with two piping segments 4 extending substantially perpendicular to the long axis thereof, although the invention is not so limited and other geometries of sight port system 2 and/or orientations thereof to piping segments 4 are employable. In the embodiment of FIG. 1, a process connection flange 16 is disposed proximate each end 28a, 28b of piping segments 4a, 4b, whereby a sight port system 100 may be fluidly connected to a process stream (not shown). In this respect, a sight port system 100 is employable like a spool piece (pipe spool) that is insertable between two process components, such as two end-flanged pipe sections (not shown). In other embodiments, one or both piping segments 4 may comprise integral assembly with a process component, such as a process vessel or process device 90. (See FIG. 3). A pipe opening (not visible) of piping segment 4a provides an inlet 92 for a liquid containing fluid process stream and a pipe opening 9 of piping segment 4b provides an outlet 94 for the process stream. (See FIG. 2).

In one embodiment, sight port system 100 comprises one or more heating components 6. Although the heating component 6 depicted in the embodiments shown in, for example, FIG. 2, is disposed substantially exterior to a hot zone 22 (described in detail below), the invention is not so limited and in other embodiments (not shown), a heating component 6 may comprise a heating apparatus that is at least partially disposed within a portion of hot zone 22.

Figure 5:
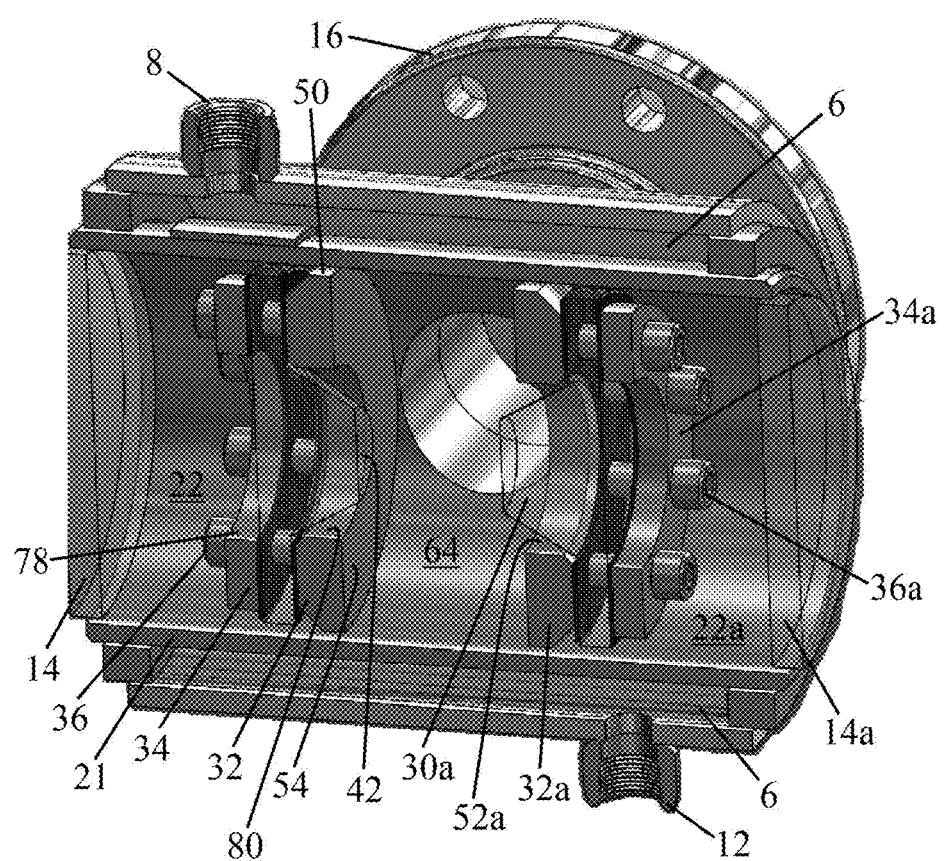
FIG. 5 is a transverse cross-sectional view of another embodiment of a sight port system of the present invention.

In one embodiment, a heating component 6 comprises a steam jacket, having a steam inlet 8 disposed through the surface 10 thereof. In accordance with this embodiment, a steam jacket 6 steam outlet 12 disposed through surface 10 is shown in FIG. 5. In one embodiment, as can be seen in FIG. 2, steam jacket 6 may cover at least a portion of one or both piping segments 4. Other exterior heating means, such as but not limited to, steam tracing and heat tape, may be employed. In one embodiment (not shown), heating component 6 may comprise one or more layers of thermal insulating material exterior thereto, as would be understood by one skilled in the art. In one embodiment, an outer insulating layer of steam jacket 6 (comprising surface 10) comprises aluminum.

In the embodiment shown in FIG. 1, sight port component 2 comprises a cavity closure component 66 positioned transversely there across; i.e., substantially parallel to the longitudinal axis of piping segments 4; and disposed proximate a first end 18 of sight port component 2. Other orientations of cavity closure components 66 may be employed, however. In one embodiment, cavity closure component 66 comprises a substantially transparent secondary lens 14. In one embodiment (not shown), a cavity closure component 66 comprises a secondary lens 14 at least partially circumferentially enclosed in a framing component (not separately labeled), such as but not limited to, a metal or plastic frame. In the embodiment shown in FIG. 1, cavity closure component 66 consists essentially of a secondary lens 14. In other embodiments (not shown), cavity closure component 66 comprises a plurality of secondary lenses 14, or is opaque.

Figure 2:
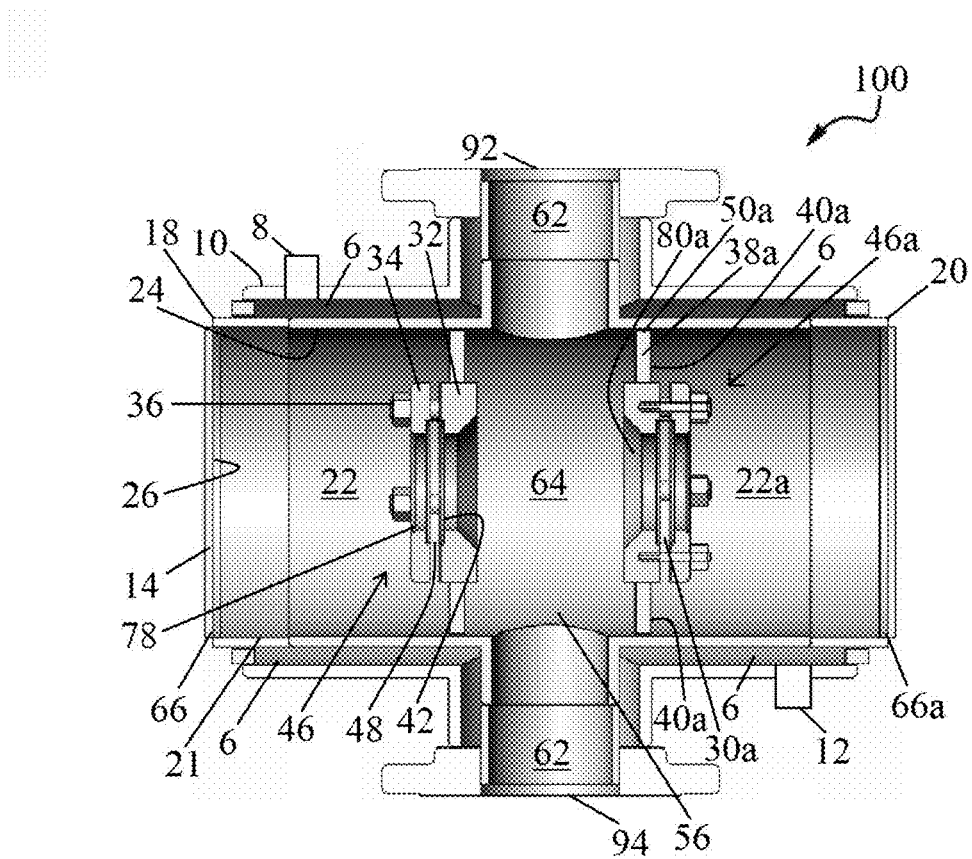
FIG. 2 is a longitudinal cross-sectional view of an embodiment of a sight port system of the present invention.
Figure 2A:
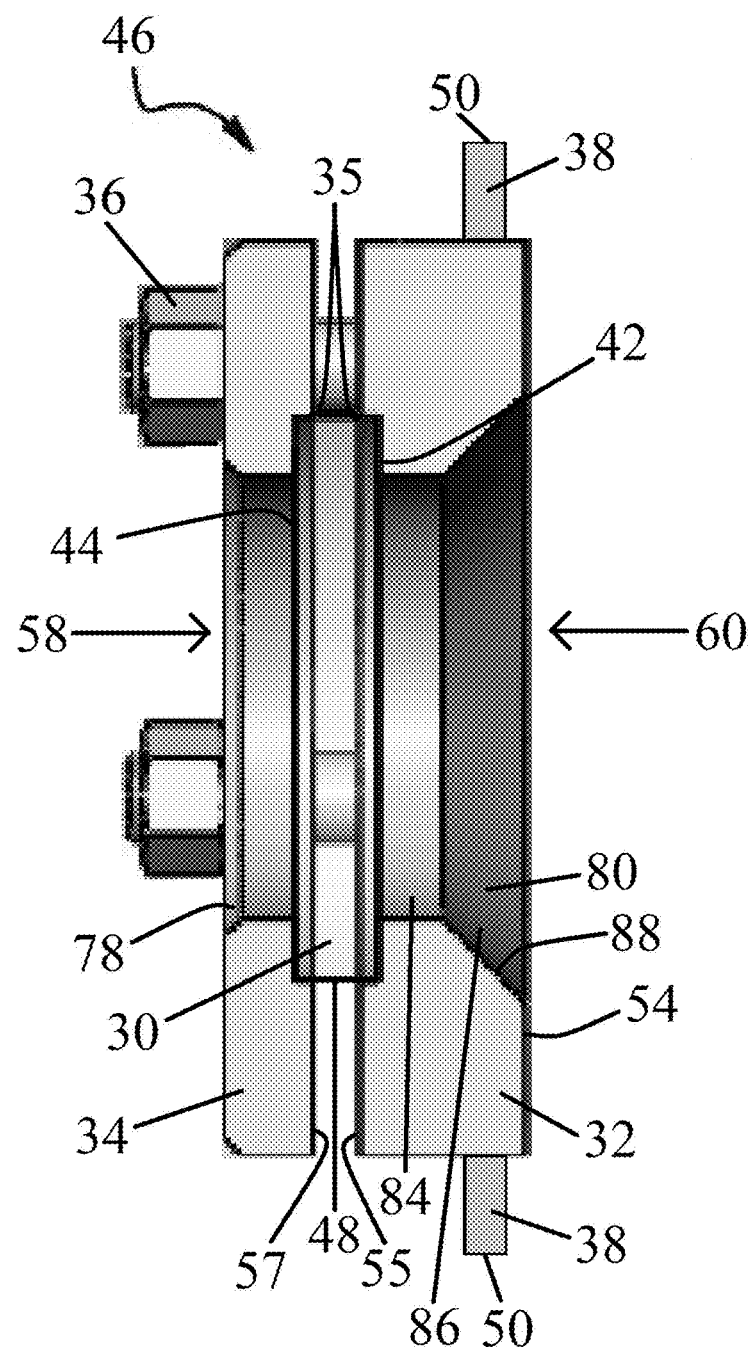
FIG. 2A is a side view of an embodiment of a primary lens assembly of the present invention.

In the embodiment of FIG. 1, sight port component 2 comprises a substantially transparent primary lens 30 disposed there within, wherein the primary lens 30 is positioned intermediate a substantially annular inner lens flange 32 and a substantially annular outer lens flange 34, to form a primary lens assembly 46, which is shown in greater detail in FIGS. 2 and 2A. (Note that in FIGS. 2, 3, and 5, analogous items are labeled "X" and/or "Xa" for convenience).

In one embodiment, as shown in FIG. 2A, inner lens flange 32 and/or outer lens flange 34 may comprise a groove 35 (see analogous item 135 labeled in FIG. 7) into which a portion of primary lens 30 may be disposed. In one embodiment, primary lens 30 is secured between inner lens flange 32 and outer lens flange 34 by means of a plurality of lens flange fasteners 36. In one embodiment, such lens flange fasteners 36 comprise bolts, screws, and/or other common fasteners. In one embodiment, securement of primary lens 30 intermediate inner lens flange 32 and outer lens flange 34 comprises extension of each of at least three lens flange fasteners 36 through an orifice (not shown) extending through outer lens flange 34 into engagement with inner flange 32, wherein primary lens 30 is positioned between the fasteners and the fasteners do not extend through the primary lens 30. In one embodiment (not shown), securement of primary lens 30 between inner lens flange 32 and outer lens flange 34 comprises extension of at least one lens flange fastener 36 through an orifice (not shown) extending through outer lens flange 34, through an orifice (not shown) extending through primary lens 30, and into engagement with inner flange 32. In one embodiment, engagement of a lens flange fastener 36 with inner flange 32 comprises threaded engagement there between, such as by engagement of exterior threading (not shown) on at least a portion of a flange fastener 36 with interior threading (not shown) on at least a portion of an orifice (not shown) extending at least partially through inner lens flange 32. In one embodiment (not shown) an annular gasket (not shown) or gasket substance (not shown) may be positioned on an inner surface 42 of primary lens 30 (or an outer surface 55 of inner lens flange 32) and/or an outer surface 44 of primary lens 30 (or an inner surface 57 of outer lens flange) to facilitate sealing contacting engagement between primary lens 30 and inner lens flange 32 and/or between primary lens 30 and outer lens flange 34, respectively.

Figure 3:
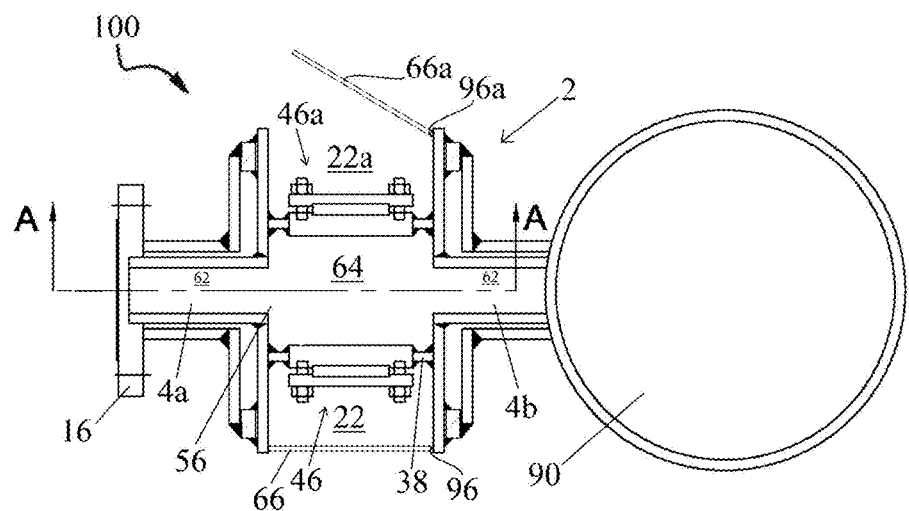
FIG. 3 is a plan view of another embodiment of a sight port system of the present invention.

In certain embodiments, as shown in FIGS. 2 and 3, inner lens flange 32 comprises an outer circumferential flange closure plate 38 that is sealingly affixable to, or integral with, an annular interior surface 24 of sight port component 2. In one embodiment, the exterior circumferential edge 50 of flange closure plate 38 is welded to interior surface 24.

Still referring to FIG. 2, a process stream (not shown) is fluidly contained within sight port system 100 to a process stream chamber 56. In one embodiment, process stream chamber 56 comprises the interior 62 of piping segments 4, as well as the interstice 64 between primary lens assemblies 46 and 46a. The dimensions of process stream chamber 56 may be varied to suit particular process and process observation needs, as would be understood by one skilled in the art. In one aspect, the interstice 64 between primary lens assemblies 46 and 46a may comprise a tubular shape dimensioned substantially similarly to the internal dimensions of the interior 62 of piping segments 4. In such an embodiment, process stream chamber 56 is essentially tubular in structure. In other embodiments, the interstice 64 between primary lens assemblies 46 and 46a may comprise a geometry that is non-tubular in shape, and/or has a greater or lesser volume than a tubular structure having substantially the same dimensions of the interior 62 of piping segments 4. In still other embodiments, interiors 62 of the piping segments 4 may not be equivalent; i.e., piping segments 4 may not have identical internal dimensions.

Figure 3A:
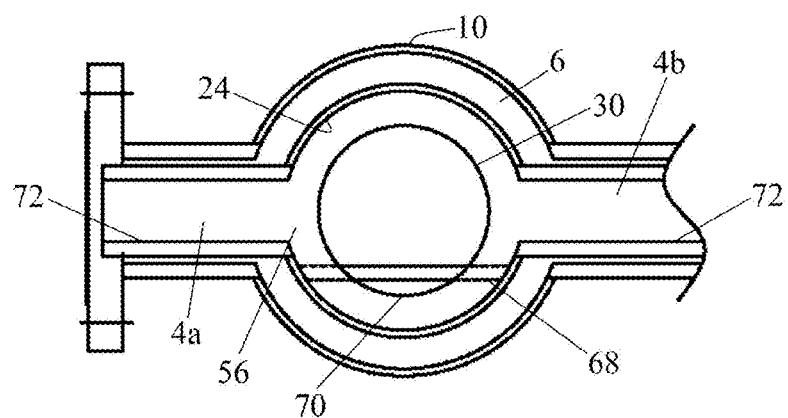
FIG. 3A is a cross-sectional view of a portion of the sight port system depicted in FIG. 3.

In one aspect, process stream chamber 56 may comprise an unsymmetrical geometry with respect to a primary lens assembly 46. In one embodiment, visible in FIG. 3A (which depicts a partial sectional view of FIG. 3 along axis A-A.), a process stream chamber 56 comprises an interstice 64 having a "bottom" wall 68 disposed at an elevation higher than a lowest elevation point 70 of primary lens 30. With this arrangement, a process stream (not shown) flowing from one piping segment 4 to the other piping segment 4 necessarily has a level at or above lowest elevation point 70, so that visual observation of the process stream through primary lens 30 is assured. In one embodiment (not shown), such a bottom wall 68 may be coextensive with an elevation of a bottom internal surface elevation 72 one or both piping segments 4.

Also can be seen in the view of the embodiment of FIG. 1, sight port component 2 comprises a substantially annular internal cavity 21 comprising a "hot zone" 22. As can be more clearly seen in FIG. 2, in one embodiment, primary lens assembly 46 is transversely disposed within first end 18 of sight port component 2. In one aspect, primary lens assembly 46 provides a fluid barrier between the process stream (not shown) contained within chamber 56 and gas (not shown) contained within hot zone 22. In one embodiment, hot zone 22 is exteriorly dimensionally defined by an annular interior surface 24 of sight port component 2, an inner face 26 of cavity closure component 66, and primary lens assembly 46. In one aspect, extension of hot zone 22 to outer surface 40 of flange closure plate 38 allows gas (not shown) within hot zone 22 to circulate around, and come into contact with, the circumferential exterior edge 48 of primary lens 30

In various embodiments, cavity closure component 66 may be at least partially removably engageable with sight port component 2. In one embodiment, cavity closure component 66 is provided in hinged engagement, via a hinge 96, with sight port component 2, such that cavity closure component 66 can be swung open to allow visual and entry access to hot zone 22. (See FIG. 3). In other embodiments (not shown), cavity closure component 66 may be removably affixed to sight port component 2, such as by screwed or magnetic engagement therewith, or by one or more bolts, cotter pins, etc., or any other removable affixation means as is known in the art.

In various embodiments, a primary lens 30 and/or secondary lens 14 comprises a silicon-based transparent material such as glass or quartz, or a polymeric transparent material such as polycarbonate. In one embodiment, a primary lens 30 and/or secondary lens 14 comprises borosilicate glass. In the embodiment shown in FIG. 2, primary lens 30 comprises a substantially planar disc shape, although other geometries may be employed. In one embodiment, shown in FIG. 5, a primary lens 30 may comprise a conical, frustum-shaped portion. In various embodiments, a frustum-shaped portion of primary lens 30 may extend within the interior 52 of inner lens flange 32, or may farther extend beyond an inner surface 54 of inner lens flange 32.

Figure 4:
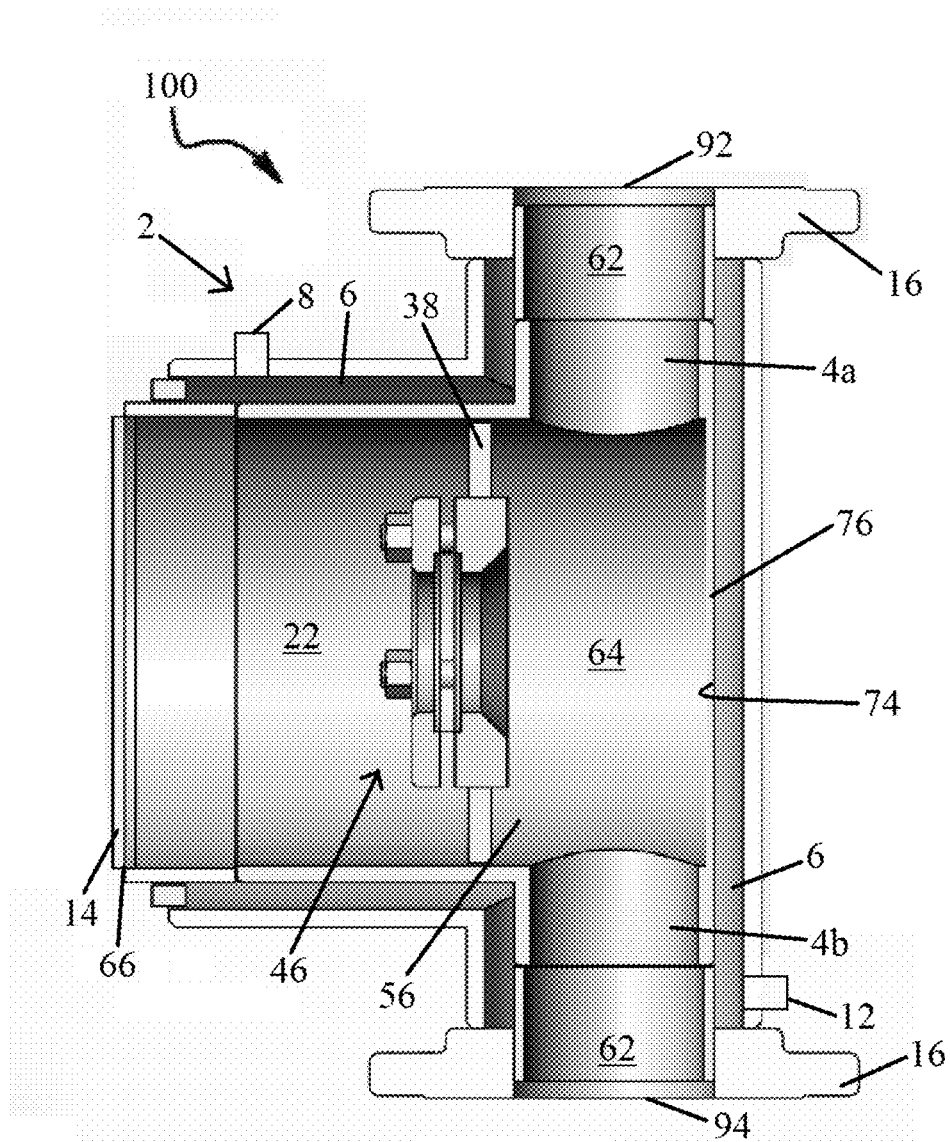
FIG. 4 is a transverse cross-sectional view of another embodiment of a sight port system of the present invention.

In the embodiment depicted in FIG. 2, sight port component 2 comprises a second primary lens assembly 46a, a similar second hot zone 22a within second end 20 thereof, and a second cavity closure component 66a. In other embodiments, such as the embodiment shown in FIG. 4, a sight port system 100 comprises only a single primary lens 30. As shown in FIG. 4, in this embodiment the process stream chamber 56 is defined by the interior 62 of piping segments 4, as well as the interstice 64 between primary lens assembly 46 and an interior surface 74 of a distal wall 76 of process stream chamber 56.

In one embodiment, as can best be seen in FIG. 5, annular outer lens flange 34 comprises a substantially centralized orifice 78 there though, through which at least a portion of primary lens 30 is visible through outer lens flange 34. In the embodiment of FIG. 5, outer lens flange 34 centralized orifice 78 is depicted to comprise a substantially round uniform geometry, however the invention is not so limited and other geometries of centralized orifice 78 may be employed. As also shown in FIG. 5, in one embodiment, annular inner lens flange 32 comprises a substantially centralized orifice 80 there through. In the embodiment of FIG. 5, inner lens flange 32 centralized orifice 80 is depicted to comprise a substantially round uniform geometry, however the invention is not so limited and other geometries of centralized orifice 80 may be employed. In the embodiment shown in detail in FIG. 2A, centralized orifice 80 has a non-uniform geometry, comprising a substantially uniform round outer portion 84, and a non-uniform inner portion 86 comprising a beveled surface 88. Centralized orifice 80 provides for fluid contact between process stream (not shown) within process stream chamber 56, and at least a portion of an inner surface 42 of primary lens 30. Such an arrangement provides for observation of the process stream (not shown) through primary lens 30, via orifices 78 and 80. Although in the embodiments depicted orifices 78 and 80 are centralized within outer lens flange 34 and inner lens flange 32, respectively, other arrangements are may be employed. In embodiments wherein cavity closure component 66 comprises a secondary lens 14, process fluid (not shown) within process stream chamber 56 may be observed through primary lens 30 and secondary lens 14.

Figure 6:
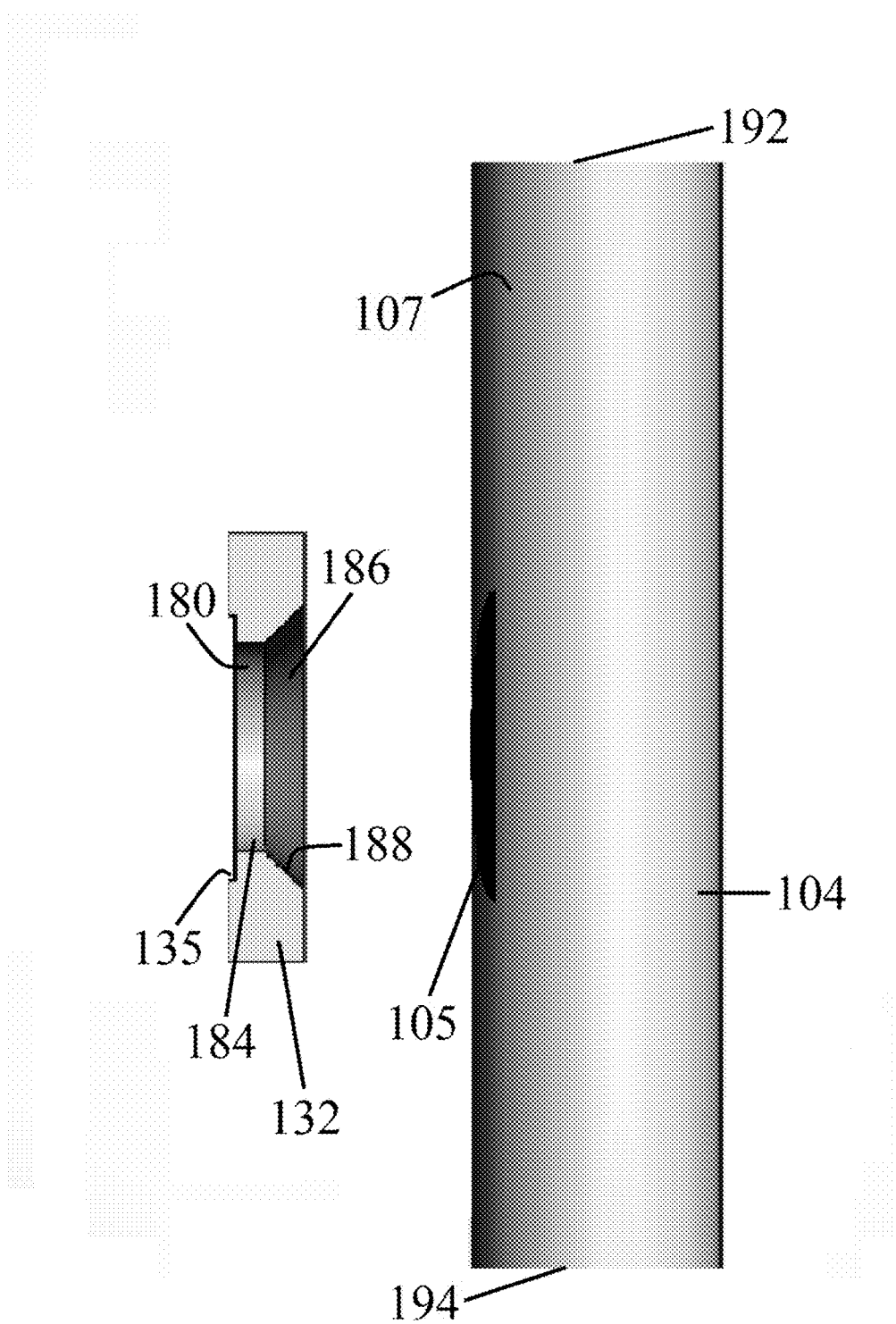
FIG. 6 depicts an embodiment of some of the components of another sight port system of the present invention.
Figure 7:
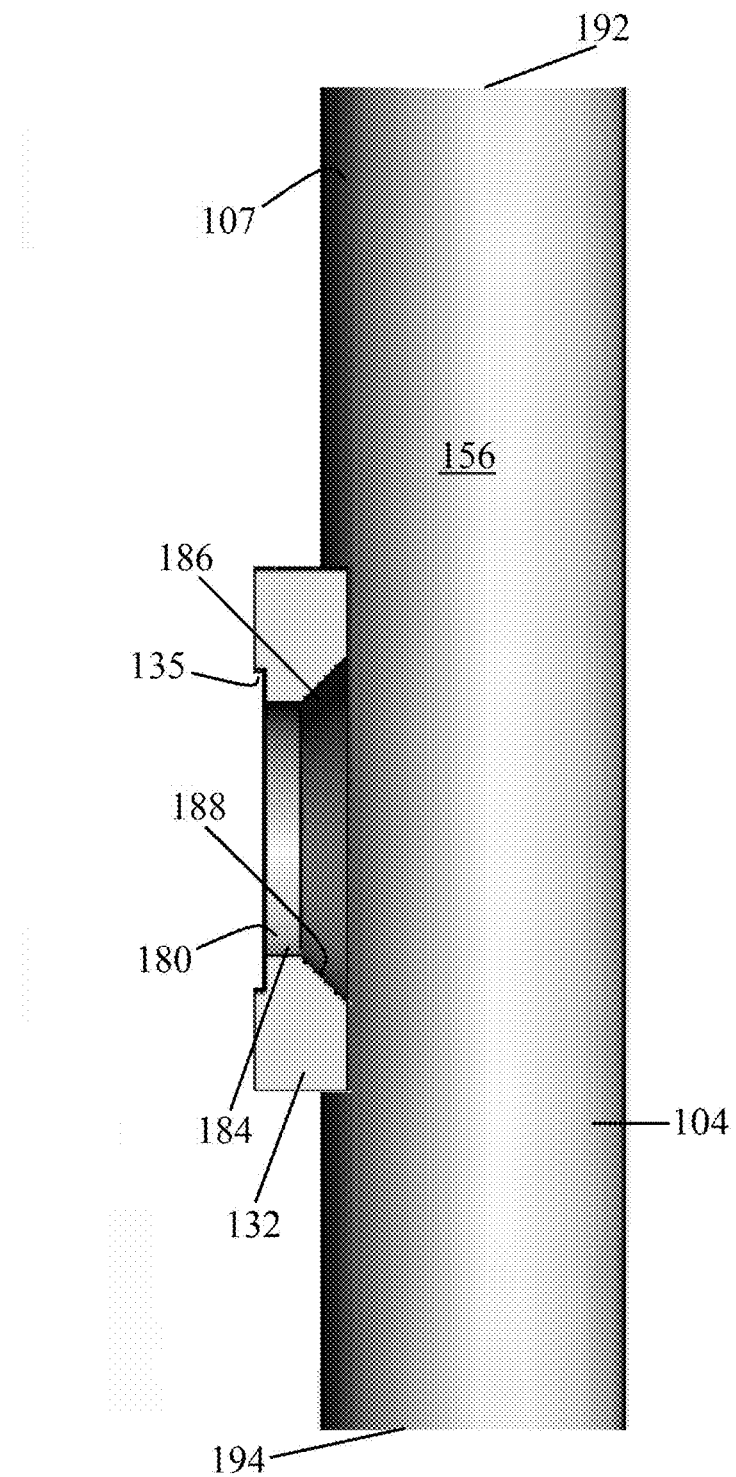
FIG. 7 depicts a combination of the sight port system components depicted in FIG. 6.

In another embodiment of the present invention, a sight port system 200 comprises a sight port component 102 provided for a pipe segment 104. (See FIG. 9). In one embodiment, as shown in FIG. 6, an inner lens flange 132 is aligned with and provided proximate the pipe segment 104 which comprises an axial opening 105. In the embodiment shown in FIG. 6, inner lens flange 132 comprises a centralized orifice 180 comprising an outer portion 184, and an inner portion 186 comprising a beveled surface 188, although geometries and/or positioning of orifice 180 may be employed. As depicted in the embodiment of FIG. 7, inner lens flange 132 is fluidly sealingly affixed to, or integral with, pipe 104, whereby opening 105 is completely covered thereby. In one embodiment, such affixation may be accomplished by welding inner lens flange 132 to the exterior surface 107 of pipe segment 104, although other affixation methods may be employed, as would be understood by one skilled in the art. In one embodiment (not shown), an attachment component, such as a flange, may be affixed to or integral with the exterior surface 107 of pipe segment 104 about opening 105, whereby inner lens flange 132 can be affixed to pipe segment 104 by engagement with the attachment component, or wherein the attachment component comprise an inner lens flange 132.

Figure 8:
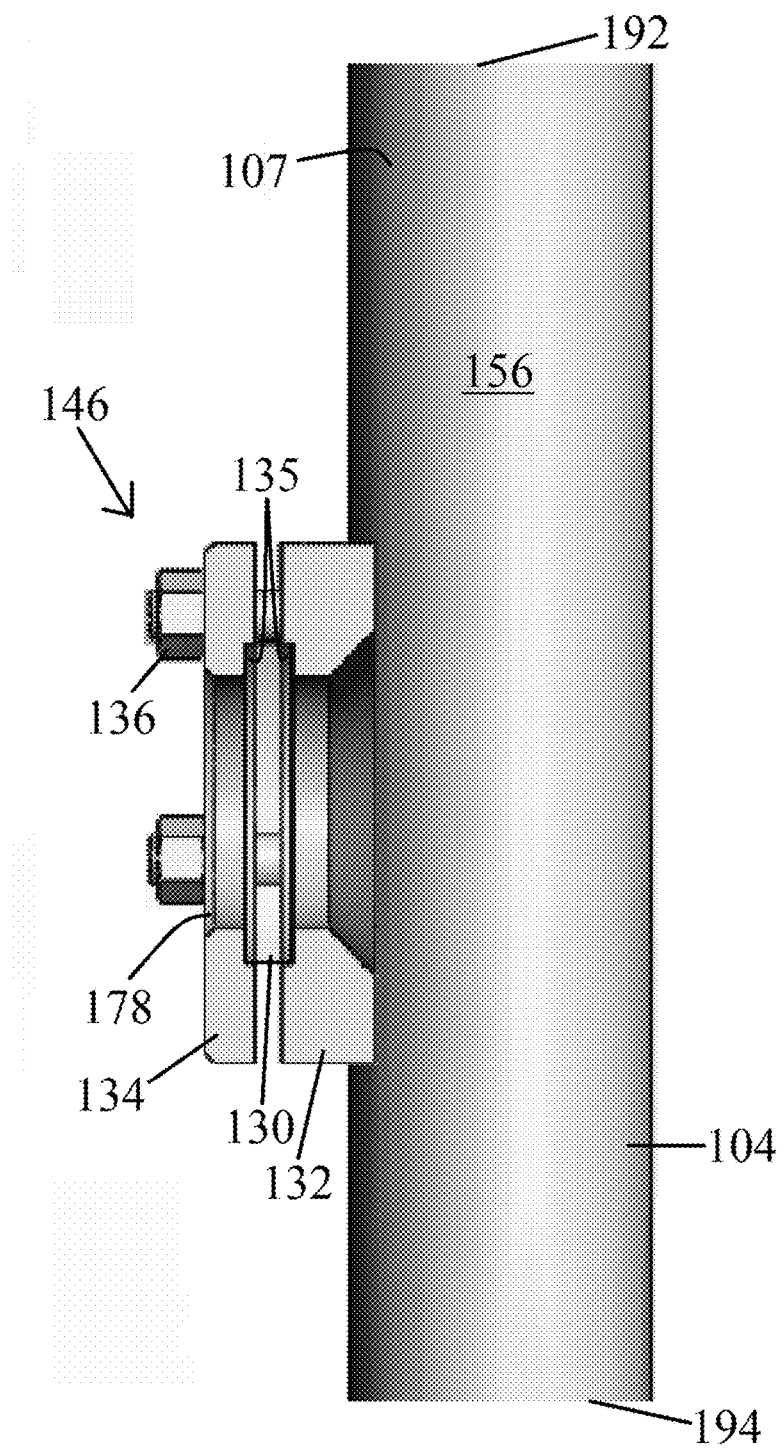
FIG. 8 depicts a portion another embodiment of a sight port system of the present invention comprising the combination of components depicted in FIG. 7.

In one embodiment, as shown in FIG. 8, once inner lens flange 132 has been affixed to pipe segment 104, a primary lens assembly 146 incorporating inner lens flange 132 can be assembled by providing a primary lens 130 and an outer lens flange 134, and affixing the primary lens 130 between the outer lens flange 134 (having a centralized orifice 178 there through) and the inner lens flange 132 with lens flange fasteners 136, as described above with regard to sight port system 100. In one embodiment (not shown), a primary lens 130 may comprise a conical, frustum-shaped portion. In various embodiments (not shown), a frustum-shaped portion of primary lens 130 may extend into the interior of inner lens flange 132 (similarly to the depiction of primary lens 30 extending into the interior 52 of inner lens flange 32 in FIG. 5), or may farther extend into the interior of pipe segment 104; i.e., process stream chamber 156 (see below).

In the embodiment shown in FIG. 8, inner lens flange 132 comprises a groove 135 into which a portion of primary lens 130 is disposed. As shown in the embodiment of FIG. 8, outer lens flange 134 similarly comprises a groove 135 into which a portion of primary lens 130 is disposed. In other embodiments, a complete primary lens assembly 146 may be affixed to pipe segment 104 to yield the configuration depicted in FIG. 8.

Figure 9:
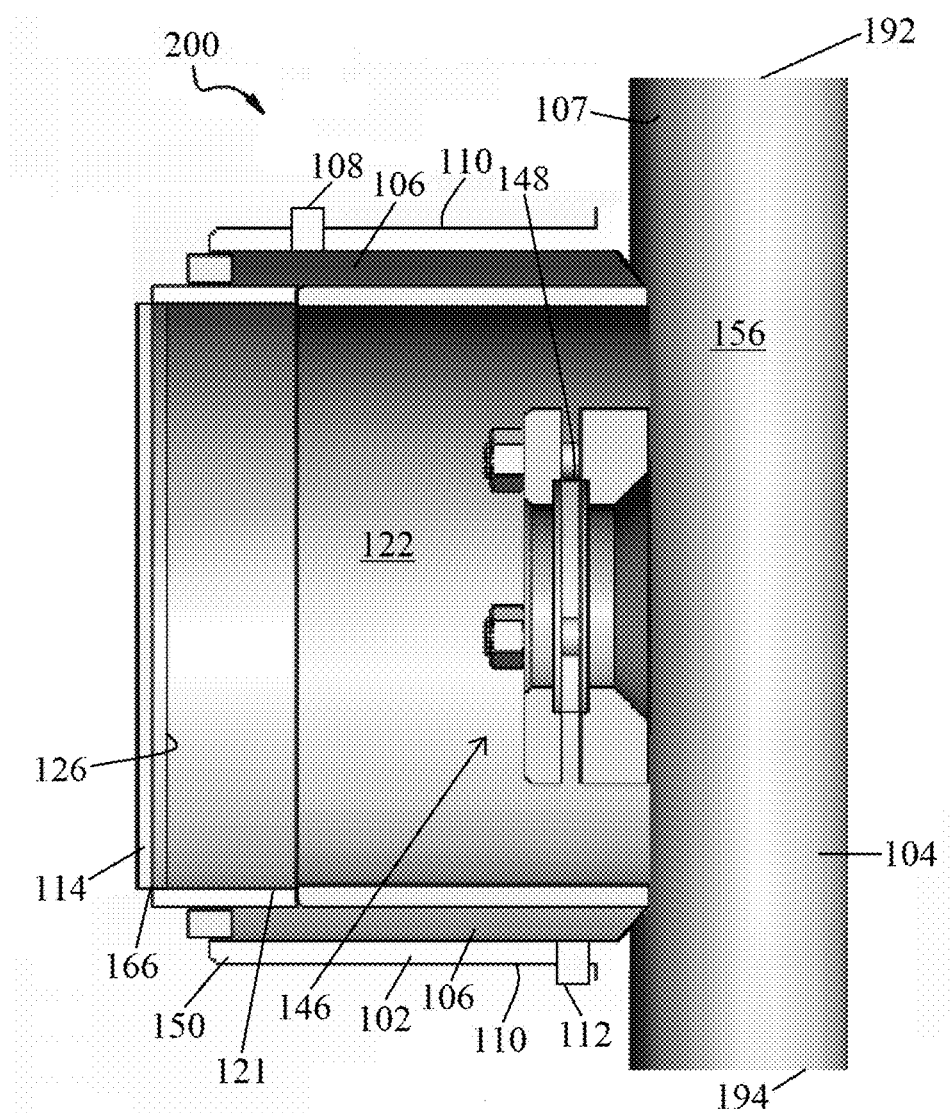
FIG. 9 depicts an embodiment of another embodiment of a sight port system of the present invention.

Referring now to FIG. 9, in one embodiment a sight port component 102 is provided by assembling the remaining portions thereof. An enclosure 150 is provided about installed primary lens assembly 146, proximate pipe segment 104. An enclosure 150 may comprise a single component or comprise an assembly of a plurality of sections cooperatively positioned. In one embodiment, sight port component 102 comprises an exterior heating component 106 similar to heating component 6 described above. In one embodiment, a heating component 106 comprises a steam jacket comprising a steam inlet 108 and steam outlet 112 disposed in a surface 110 thereof. In one embodiment, sight port component 102 comprises a cavity 121 comprising a hot zone 122 similar to sight port component 2 hot zone 22. In the embodiment depicted in FIG. 9, inner lens flange 132 does not comprise a flange closure plate analogous to flange closure plate 38, and thus hot zone 122 extends to at least a portion of exterior surface 107 of pipe segment 104, and thereby surrounds an exterior edge 148 of primary lens 130. In one embodiment, sight port component 102 comprises a cavity closure component 166 (similar to cavity closure component 66 described above) that comprises one or more secondary lenses 114, or is opaque. In one embodiment of sight port component 102 (not shown), enclosure 150, and optionally steam jacket 106, may encase at least a portion of pipe segment 104.

In one aspect of the embodiments shown in FIGS. 6-9, pipe segment 104 comprises an inlet 192 and an outlet 194, and the interior of pipe segment 104 constitutes a process stream chamber 156 of sight port system 200. Similarly to sight port system 100, process fluid (not shown) within process stream chamber 156 may be observed through primary lens 130. In embodiments wherein cavity closure component 166 comprises a secondary lens 114, process fluid (not shown) within process stream chamber 156 may be observed through primary lens 130 and secondary lens 114.

In one embodiment of a sight port system 200 (not shown), a pipe segment 104 comprises two openings 105 on opposing sides thereof, wherein the sight port component 102 comprises a primary lens assembly 146 associated (as described above) with each opening 105. In such an embodiment, a single enclosure 150 enclosing both primary lens assemblies 146 and hot zones 122 may be employed, or two separate enclosures may be utilized, as would be understood by one skilled in the art. In either embodiment, the enclosure(s) 150 may comprise two opposingly positioned cavity closure components 166, similarly to sight port component 2 depicted in FIG. 2. Further in such an embodiment, the hot zone 122 may extend from an internal surface 126 of one cavity closure component 166 to an internal surface 126 of the other cavity closure component 166.

Operation

In one embodiment, a sight port system 100 or 200 is fluidly connectively installed in-line in an industrial process, such as, but not limited to, a chemical process, whereby a process stream (not shown), such as but not limited to, molten sulfur, can be flowed into the sight port system inlet 92, and whereby the introduced process stream flows through process stream chamber 56 (in a sight port system 100) or through pipe segment 104 (in a sight port system 200) and then flows out of the sight port system outlet 94, or pipe segment outlet 194, respectively. In various embodiments, the process stream introduced to the process stream chamber 56 or pipe segment 104 may be provided directly from a process vessel or component, and/or the process stream exiting the sight port system may be provided directly to a process vessel or component. (See, e.g., FIG. 3).

In one embodiment, a process stream (not shown) comprising molten sulfur is introduced via inlet 92 to a sight port system 100. A heating component, such as a steam jacket 6 is actuated to provide heat to sight port component 2, including hot zone 22. In one embodiment, steam (not shown) is provided to steam jacket 6, via steam inlet 8, at a pressure of about 50 psig, although other steam pressures may be employed, as would be understood by one skilled in the art. As the process stream flows past at least one primary lens 30, an observation of the flow of the process stream within process stream chamber 56 is performed, either by an operator looking through a primary lens 30, or by an electronic visual detection device being directed through a primary lens 30.

In one embodiment, when the sight port component 2 being employed comprises at least one cavity closure component 66 comprising a secondary lens 14, flow observation may be performed there though without having to at least partially displace that cavity closure component 66. In other embodiments, an opaque cavity closure component 66 can be at least partially displaced, e.g., swung open via a hinge 96, to provide visual access to a primary lens 30. When utilizing embodiments of a sight port system 100 or 200 comprising two primary lenses 30, observation of the process stream within process stream chamber 56 (in a sight port system 100) or within pipe segment 104 (in a sight port system 200) may be performed via either or both primary lenses.

In one aspect of sight port system 100, utilization of a cavity closure component 66 provides a substantially gaseously sealed hot zone 22. By keeping hot zone 22 substantially gaseously sealed, either continuously by employing at least one secondary lens 14, or intermittently when partially displacing cavity closure component 66 only to observe process stream flow, primary lens 30 is heated by heat transfer through inner lens flange 32 (via flange closure plate 38) and gas, typically air, contained within hot zone 22. In one aspect, the configuration of primary lens assembly 46 within sight port component 2 allows the heated gas within hot zone 22 to contact the exterior edge 48 of primary lens 30. This exterior edge heating of primary lens 30 reduces lens condensation and/or solidification issues typically experienced in prior art sulfur process viewing systems. When utilizing a sight port system 200, similar heating of exterior edge 148 of primary lens 130 is accomplished.

Method

An exemplary method 300 of observing a process stream utilizing a sight port system 100 of the present invention comprises:

A Sight Port System Provision Step 302, comprising providing a sight port system, such as sight port system 100, in fluid communication with a liquid containing fluid process stream.

A Process Stream Provision Step 304, comprising flowing the fluid process stream into the sight port system via a fluid inlet, such as fluid inlet 92, and allowing the process stream to flow through a process stream chamber, such as process stream chamber 56, and out of the sight port system via a fluid outlet, such as fluid outlet 94.

A Sight Port System Heating Step 306, comprising actuating a sight port system exterior heating component, such as exterior heating component 6, to provide heat to the sight port system.

A Process Stream Observation Step 308, comprising viewing the process stream within the process stream chamber via a lens, such as primary lens 30, by either viewing the primary lens through a secondary lens, such as secondary lens 14, contained in or comprising a cavity closure component, such as cavity closure component 66, or by a least partially displacing the cavity closure component.

Method 300 is merely exemplary, and additional embodiments of a method of utilizing a sight port system 100 of the present invention consistent with the teachings herein may be employed. In addition, in other embodiments, one or more of these steps may be combined, repeated, re-ordered, or deleted, and/or additional steps may be added.

An exemplary method 400 of observing a process stream utilizing a sight port system 200 of the present invention comprises:

A Sight Port System Provision Step 402, comprising providing a sight port system, such as sight port system 200, in fluid communication with a liquid containing fluid process stream.

A Process Stream Provision Step 404, comprising flowing the fluid process stream into the sight port system via a fluid inlet, such as fluid inlet 192, and allowing the process stream to flow through a pipe segment, such as pipe segment 104, and out of the sight port system via a fluid outlet, such as fluid outlet 194.

A Sight Port System Heating Step 406, comprising actuating a sight port system exterior heating component, such as exterior heating component 106, to provide heat to the sight port system.

A Process Stream Observation Step 408, comprising viewing the process stream within the process stream chamber via a lens, such as primary lens 130, by either viewing the primary lens through a secondary lens, such as secondary lens 114, contained in or comprising a cavity closure component, such as cavity closure component 166, or by a least partially displacing the cavity closure component.

Method 400 is merely exemplary, and additional embodiments of a method of utilizing a sight port system 200 of the present invention consistent with the teachings herein may be employed. In addition, in other embodiments, one or more of these steps may be combined, repeated, re-ordered, or deleted, and/or additional steps may be added.

The foregoing description of the invention illustrates an exemplary embodiment thereof. Various changes may be made in the details of the illustrated construction and process within the scope of the appended claims without departing from the teachings of the invention. The present invention should only be limited by the claims and their equivalents.

I claim:

1. A sight port system comprising:
   a sight port component comprising:
      at least one heating component;
      a process stream chamber;
      a primary lens assembly;
      a substantially tubular internal cavity comprising a hot zone; and
      a cavity closure component;
   wherein:
      said primary lens assembly comprises:
         an inner lens flange;
         an outer lens flange,
         a primary lens positioned intermediate said inner lens flange and said outer lens flange; and
         a flange closure plate disposed circumferentially about said inner lens flange;
      said flange closure plate is circumferentially sealing affixed to, or integral with, an inner surface of said internal cavity;
      said primary lens assembly fluidly segregates said process stream chamber from said hot zone;
      said hot zone:
         is disposed within said internal cavity;
         is transversely bounded at a first end thereof by said primary lens assembly; and
         is transversely bounded at a second end thereof by said cavity closure component;
      at least a portion of said primary lens is disposed intermediate the exterior surface of said process stream chamber and said cavity closure component, whereby said primary lens is positioned at least partially within said hot zone;
      at least one said heating component provides heat to said hot zone; and
      at least a portion of the interior of said process stream chamber is visible through said primary lens.

2. The sight port system of claim 1, wherein said cavity closure component is at least partially removably attached to said sight port component.

3. The sight port system of claim 1, wherein:
   said cavity closure component comprises a secondary lens; and
   at least a portion of the interior of said process stream chamber is visible through said secondary lens via said primary lens.

4. The sight port system of claim 1, wherein at least one said heating component comprises a steam jacket.

5. The sight port system of claim 1, wherein said primary lens comprises a conical, frustum-shaped portion.

6. The sight port system of claim 5, wherein at least a portion of said primary lens extends into said process stream chamber.

7. The sight port system of claim 1, wherein said sight port component comprises:
   a first primary lens assembly and a second primary lens assembly;
   a first substantially tubular internal cavity comprising a first hot zone and a second substantially tubular internal cavity comprising a second hot zone; and
   a first cavity closure component and a second cavity closure component;
   wherein:
      said first primary lens assembly comprises:
         a first inner lens flange;
         a first outer lens flange,
         a first primary lens positioned intermediate said first inner lens flange and said first outer lens flange; and
         a first flange closure plate disposed circumferentially about said first inner lens flange; and
      said first flange closure plate is circumferentially sealing affixed to, or integral with, an inner surface of said first internal cavity;

said first primary lens assembly fluidly segregates said
process stream chamber from said first hot zone;
said first hot zone:
is disposed within said first internal cavity;
is transversely bounded at a first end thereof by said first primary lens assembly; and
is transversely bounded at a second end thereof by said first cavity closure component;
said first primary lens is disposed intermediate said first flange closure plate equipped first inner lens flange and said first cavity closure component, whereby said first primary lens is positioned at least partially within said first hot zone;
at least one said heating component provides heat to said first hot zone;
at least a portion of the interior of said process stream chamber is visible through said first primary lens;
said second primary lens assembly comprises:
a second inner lens flange;
a second outer lens flange,
a second primary lens positioned intermediate said second inner lens flange and said second outer lens flange; and
a second flange closure plate disposed circumferentially about said second inner lens flange; and
said second flange closure plate is circumferentially sealing affixed to, or integral with, an inner surface of said second internal cavity;
said second primary lens assembly fluidly segregates said process stream chamber from said second hot zone;
said second hot zone:
is disposed within said second internal cavity;
is transversely bounded at a first end thereof by said second primary lens assembly; and
is transversely bounded at a second end thereof by said second cavity closure component;
said second primary lens is disposed intermediate said second flange closure plate equipped second inner lens flange and said second cavity closure component, whereby said second primary lens is positioned at least partially within said second hot zone;
at least one said heating component provides heat to said second hot zone; and
at least a portion of the interior of said process stream chamber is visible through said second primary lens.

8. A sight port system comprising:
a sight port component comprising:
at least one heating component;
a primary lens assembly;
a substantially tubular internal cavity comprising a hot zone; and
a cavity closure component; and
a process pipe segment comprising an axial opening extending through the surface thereof;
wherein:
said primary lens assembly comprises:
an inner lens flange;
an outer lens flange, and
a primary lens positioned intermediate said inner lens flange and said outer lens flange;
said inner lens flange is fixedly attached to, or integral with, the exterior surface of said pipe segment;
said inner lens flange completely surrounds said pipe segment opening;
said primary lens assembly fluidly segregates the interior of said pipe segment from said hot zone;
said hot zone:
is disposed within said internal cavity;
is transversely bounded at a first end thereof by said primary lens assembly and a portion of the exterior surface of said pipe segment; and
is transversely bounded at a second end thereof by said cavity closure component;
at least a portion of said primary lens is disposed intermediate the exterior surface of said pipe segment and said cavity closure component, whereby said primary lens is positioned at least partially within said hot zone;
at least one said heating component provides heat to said hot zone; and
at least a portion of the interior of said pipe segment is visible through said primary lens.

9. The sight port system of claim 8, wherein said cavity closure component is at least partially removably attached to said sight port component.

10. The sight port system of claim 8, wherein:
said cavity closure component comprises a secondary lens; and
at least a portion of the interior of said pipe segment is visible through said secondary lens via said primary lens.

11. The sight port system of claim 8, wherein at least one said heating component comprises a steam jacket.

12. The sight port system of claim 8, wherein said primary lens comprises a conical, frustum-shaped portion.

13. The sight port system of claim 12, wherein at least a portion of said primary lens extends into said process stream chamber.

14. The sight port system of claim 8, wherein said sight port component comprises:
a first primary lens assembly and a second primary lens assembly;
a first substantially tubular internal cavity comprising a first hot zone and a second substantially tubular internal cavity comprising a second hot zone; and
a first cavity closure component and a second cavity closure component;
wherein:
said first primary lens assembly comprises:
a first inner lens flange;
a first outer lens flange, and
a first primary lens positioned intermediate said first inner lens flange and said first outer lens flange;
said first primary lens assembly fluidly segregates the interior of said pipe segment from said first hot zone;
said first hot zone:
is disposed within said first internal cavity;
is transversely bounded at a first end thereof by said first primary lens assembly and a portion of the exterior surface of said pipe segment; and
is transversely bounded at a second end thereof by said first cavity closure component;
said first primary lens is disposed intermediate the exterior surface of said pipe segment and said first cavity closure component, whereby said first primary lens is positioned at least partially within said first hot zone;
at least one said heating component provides heat to said first hot zone;
at least a portion of the interior of said pipe segment is visible through said first primary lens;

said second primary lens assembly comprises:
  a second inner lens flange;
  a second outer lens flange, and
  a second primary lens positioned intermediate said second inner lens flange and said second outer lens flange;
said second primary lens assembly fluidly segregates the interior of said pipe segment from said second hot zone;
said second hot zone:
  is disposed within said second internal cavity;
  is transversely bounded at a first end thereof by said second primary lens assembly and a portion of the exterior surface of said pipe segment; and
  is transversely bounded at a second end thereof by said second cavity closure component;
said second primary lens is disposed intermediate the exterior surface of said pipe segment and said second cavity closure component, whereby said second primary lens is positioned at least partially within said second hot zone;
at least one said heating component provides heat to said second hot zone; and
at least a portion of the interior of said pipe segment is visible through said second primary lens.

15. A method of visually observing a process stream, comprising:
providing one or more sight port components proximate said process stream, at least one said sight port component comprising:
  at least one heating component;
  a primary lens assembly;
  a substantially tubular internal cavity comprising a hot zone; and
  a cavity closure component;
wherein:
  said primary lens assembly comprises:
    an inner lens flange;
    an outer lens flange, and
    a primary lens positioned intermediate said inner lens flange and said outer lens flange;
  said primary lens assembly fluidly segregates said process stream from said hot zone;
  said hot zone:
    is disposed within said internal cavity;
    is transversely at least partially bounded at a first end thereof by said primary lens assembly; and
    is transversely bounded at a second end thereof by said cavity closure component;
  at least a portion of said primary lens is disposed intermediate the external surface of a boundary of said process stream and said cavity closure component, whereby said primary lens is positioned at least partially within said hot zone;
utilizing at least one said heating component to provide heat to said hot zone; and
visually observing at least a portion of said process stream through said primary lens.

16. The method of claim 15, wherein:
said sight port component comprises a process stream chamber through which said process stream flows;
a flange closure plate is disposed circumferentially about said inner lens flange; and
said flange closure plate is circumferentially sealing affixed to, or integral with, an inner surface of said internal cavity.

17. The method of claim 15, wherein said cavity closure component is at least partially removably attached to said sight port component.

18. The method of claim 15, wherein:
said cavity closure component comprises a secondary lens; and
at least a portion of said process stream is visible through said secondary lens via said primary lens.

19. The method of claim 15, wherein at least one said heating component comprises a steam jacket.

20. The method of claim 15, wherein said primary lens assembly is affixed to, or integral with, a pipe segment through which said process stream flows.

* * * * *